May 5, 1970     H. A. BAKKE ET AL     3,510,774
MOVING MAGNET INSTRUMENT ADAPTED FOR BLIND ASSEMBLY
Filed June 15, 1966
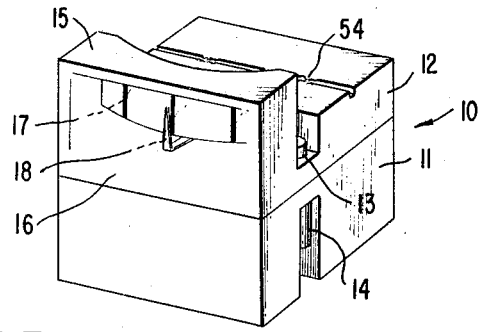
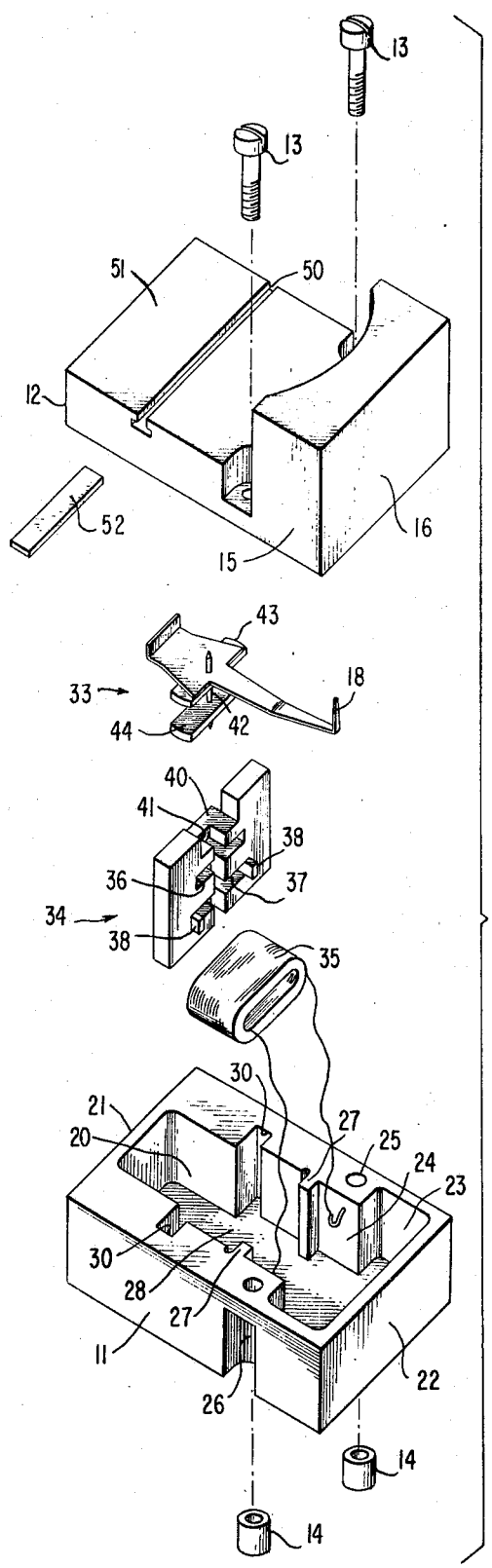
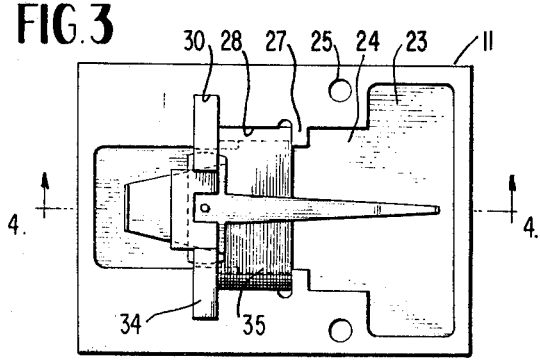
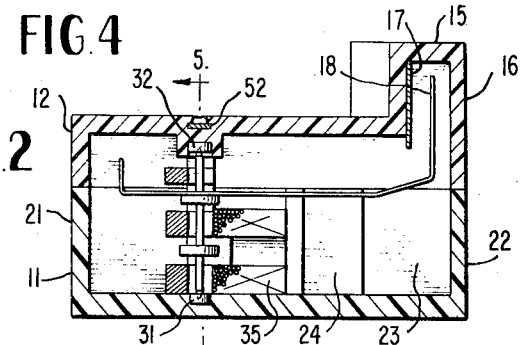
INVENTORS
HANS A. BAKKE
ALMON J. CORSON
WARREN N. KERNANDER
CARL F. VAN BENNEKOM
BY Richard E. Horley
ATTORNEY

United States Patent Office 3,510,774
Patented May 5, 1970

3,510,774
MOVING MAGNET INSTRUMENT ADAPTED FOR BLIND ASSEMBLY
Hans A. Bakke, Swampscott, Almon J. Corson, Beverly, Warren N. Kernander, Boxford, and Carl F. Van Bennekom, Lynnfield, Mass., assignors to General Electric Company, a corporation of New York
Filed June 15, 1966, Ser. No. 557,692
Int. Cl. G01r 1/38, 1/14, 1/04
U.S. Cl. 324—146    4 Claims

ABSTRACT OF THE DISCLOSURE

An edgewise meter having zero point and sensitivity control and damping and being adapted for blind assembly. A magnetic wire is located in a groove formed in an exterior housing surface. The groove determines zero point; wire position in the groove, sensitivity. An electrodynamic plate coacts with the rotor assembly. A bearing is mounted directly to the each of two housing portions. The rotor is located in one bearing and supported by the damping plate during assembly so the rotor engages the other bearing during final assembly.

BACKGROUND OF THE INVENTION

This invention is generally directed to electrical measuring instruments and more particularly to electrical measuring instruments using moving magnet assemblies.

Within recent years a particular need has developed for electrical measuring instruments of reasonable accuracy and moderate expense. Applications for such instruments have grown widely and range from use as automobile electrical meters to photographic light meters. However, in all of these applications it has been desired to obtain a compact instrument which has an accurate zero point, which has adjustable sensitivity and which is reasonable well damped so that accurate readings are obtained.

In the prior art accurate readings have been obtained by using a zero point set magnet to locate a moving magnet assembly and pointer when the instrument is not energized. As accurate readings also depend upon sensitivity as manifested by full-scale meter deflection, shunting the energizing coils or varying the plane of the zero set magnet with respect to the plane of the moving magnets have been used to adjust sensitivity. However, when coil shunts or a plurality of magnets provide both zero set and sensitivity adjustment, the size and expense of the instrument are increased.

Therefore, it is a object of this invention to provide a relatively small and inexpensive measuring instrument having reasonable accuracy.

Another object of this invention is to provide an electrical measuring instrument wherein sensitivity adjustments can be made without a loss of accuracy.

Instrument effectiveness is also dependent upon instrument damping. If an instrument is not damped, its response time is affected, the response time being the time delay between an energy level change and the moment in time when the pointer movement stops. In addition, readings are subjected to error as a result of transients, vibration, shock or other causes in non-damped meters. Viscous damping and the electrodynamic damping have been developed in the prior art. However, containment of the viscous damping liquid and determination of the exact quantity of liquid ot be utilized are illustrative of inherent problems involved with viscous damping. Usually instruments using electrodynamic damping require additional magnets with an attendant increase in size and cost.

Still another object of this invention is to provide an electrodynamically damped moving magnet measuring instrument which is relatively small and inexpensive.

Another object of this invention is to provide an electrical measuring instrument having a damped permanent magnet meter movement.

Still another desirable feature of this particular type of electrical measuring instrument is that it be assembled in a blind configuration whereby the rotating shaft is pivoted on an internal assembly. This has generally been accomplished in the prior art by using an auxiliary frame member which has the moving magnet assembly pivoted thereon, the auxiliary frame and the moving magnet assembly forming a sub-assembly which is subsequently located within the housing. However, this scheme requires an additional locating step of the sub-assembly during manufacture.

It is an object of this invention to provide a blind electrical measuring instrument wherein jeweled pivots can be used without requirement for auxiliary frames.

Still another object of this invention is to provide an electrical measuring instrument having means for facilitating a blind assembly including proper location of a rotating member and pivot means.

SUMMARY

Briefly, these desirable measuring instrument features and characteristics are realized in an improved electrical measuring instrument by accurately locating magnetic material in an external portion of the meter housing so that the longitudinal or polar axis of the magnetic material intersects the axis of rotation of the moving magnet assembly of the instrument. As the housing is only composed of an electrical insulating material, the magnetic field produced by the magnetic material is coupled to the moving magnet assembly so that the angular position of the magnetic material is determinative of the moving magnet assembly zero point. Moving the magnetic material along its longitudinal axis causes a sensitivity change without changing the zero point. Accuracy is additionally improved by a damping plate formed of conductive, non-magnetic material disposed so the axis of the permanent magnet rotation lies in the plane of the damping plate. Furthermore, the damping plate serves to locate the coil associated with such a meter movement in its proper location and to facilitate blind assembly of the meter movement.

The invention has been pointed out with particularity in the appended claims. The above and further objects and advantages of an electrical measuring instrument built in accordance with this invention may be understood by reference to the following description of a preferred embodiment of the electrical measuring instrument taken in conjunction with the accompanying drawings.

BRIEF DESCRIPTION OF THE DRAWINGS

FIG. 1 illustrates a perspective view of an improved electrical measuring instrument built in accordance with this invention;

FIG. 2 illustrates an exploded view of the instrument shown in FIG. 1;

FIG. 3 illustrates a view from above the instrument shown in FIG. 1 with the cover removed;

FIG. 4 is a sectional view along lines 4—4 in FIG. 3;

FIG. 5 is a section view along lines 5—5 in FIG. 4.

DESCRIPTION OF AN ILLUSTRATIVE EMBODIMENT

Referring to FIG. 1, the electrical measuring instrument comprises a hollow casing 10 including a bottom portion 11 and a top portion 12 which are fastened together by fastening means such as a bolt 13 and a terminal-nut 14. The hollow casing portions 11 and 12 are made of non-magnetic material such as a plastic and a front portion 15 of the upper casing portion 12 has a transparent portion 16 to permit visual access to an indicating card 17 and a pointer 18.

Referring specifically to FIG. 2, the bottom portion 11 has a cavity 20 formed therein defined by opposite end walls 21 and 22. A first cavity portion 23 adjacent the end wall 22 extends substantially across the width of the bottom portion 11 and communicates with a second portion 24 which is reduced in size so that apertures 25 and exterior recesses 26 can be formed. A pair of inwardly extending ribs 27 on the bottom housing portion 11 defined a third cavity portion 28. A pair of transverse recesses 30 define a transverse axis across the width of the bottom portion 11. An axis of rotation, perpendicular to a plane defined by the transverse axis and a centrally located longitudinal axis, is located at the intersection of those axes.

Two jewels 31 and 32, shown in FIG. 4, are located in the housing portions 11 and 12, respectively, to support a rotatable magnet assembly 33 for rotation on the axis of rotation. Recesses 30 support a damping plate 34, more specifically described hereinafter; and a magnetic actuating coil 35, connected electrically to the terminal-nuts 14, is wedged between the damping plate 34 and the ribs 27.

Referring again to FIG. 2, the damping plate 34 is formed from a planar, non-magnetic, electrical conducting material such as copper. Two spaced, parallel, transverse slots 36 and 37 permit free rotational motion of the magnet assembly 33. Tabs 38 which extend normal to the plane of the damping plate 34 serve to accurately position the coil 35 with respect to the magnetic assembly 33 and the damping plate 34. A central portion 40 is offset perpendicularly to the plane of damping plate 34 to permit a vertically extending slot 41 to be formed therethrough. This construction locates the axis of rotation of a magnet assembly shaft 42 in the plane of damping plate 34. In addition, the slot is dimensioned to permit blind assembly as will be pointed out hereinafter.

The magnet assembly 33 includes the pointer 18, a first magnet 43 and a second magnet 44 which are affixed to the shaft 42. Magnets 43 and 44 are mounted in an astatic relationship as known in the art with the pole axes of each magnet perpendicular to the axis of pointer 18. When the instrument is assembled as shown in FIGS. 3–5, magnet assembly 33 is capable of a limited rotational motion determined by the opening through coil 35 and the configuration of the cavity 20 in lower member 11.

In order to set the zero point for pointer 18, an accurately located slot 50 is formed transversely across the upper portion 12 in an exterior surface 51 so that it intersects the axis of rotation of magnet assembly 33. A magnetic field producing means shown diagrammatically as a magnetic strip 52, is located in slot 50. Generally the magnetic field producing means should be malleable, ductile, and machinable and should be composed of a highly coercive, permanent magnet alloy such as Cunife (an alloy having a composition of 60% copper, 20% nickel, and 20% iron). Rather than a strip, a wire could also be used such as a Cunife wire. The angular positions of the magnet strip 52 and the slot 50 relative to the axis of rotation of magnet assembly 33 determine the zero point of the magnet assembly 33. In this particular embodiment a zero-center scale instrument is shown. By machine locating the slot 50 during manufacture of the housing top portion 12, it has been found that a zero point accuracy of 5% is attainable.

The sensitivity of the electrical measuring instrument is determined by the position of the wire 52 in the slot 50. As the strip 52 is displaced radially with respect to the axis of rotation of the shaft 42, the restoring torque caused by the magnetic field coupled from the wire 52 to the magnet 43 and the sensitivity are varied. However, the polar axis of the magnetic field produced by the wire 52 remains unchanged so that the zero point also remains unchanged. When the sensitivity adjustment is completed, the wire 52 is anchored in the slot 50. If the housing top portion 12 is formed of a proper material, anchoring can be accomplished merely by applying heat to the housing to melt portions of the material designated by numeral 54 and thereby close the slot 50, by cementing the magnetic strip 52 to the top portion 12 or by other well known means.

As the damping plate 34 is formed of a non-magnetic, electrically conducting material such as copper, motion of the magnets 43 and 44 tends to produce eddy currents in damping plate 34. As is well known in the art, the magnetic fields set up by these eddy currents tend to oppose the fields producing them so that the interaction of the magnetic fields produced by the magnets 43 and 44 and the damping plate 34 dampens any oscillatory motion caused by changes in energy level or by mechanical vibration or shock.

As will be noted in FIGS. 4 and 5 particularly, the electrical measuring instrument is blindly jeweled. Although blind assembly is normally difficult, the slot 41 formed in the damping plate 34 facilitates blind assembly. The slot 41 is dimensioned so that the shaft 42 tilts slightly toward the end wall 21 to displace the magnet assembly center of gravity toward the end wall 21 when the shaft 42 is properly located in the bottom jewel 31. Stable positioning of the magnet assembly 33 is thereby provided while the upper end of the shaft 42 is slightly displaced from its proper position. When the top portion 12 of the housing is properly positioned during assembly, slots in the top portion 12 register with the slots 30 and engage the damping plate 34 to initially and properly locate the top portion 12. As the top portion 12 is lowered to the bottom portion 11, the relatively inclined surfaces called pivots on the end of the shaft 42 and in the upper jewel 32 engage and the shaft 40 slides therealong to be properly positioned in the jewel 32.

Hence, it can be seen that the damping plate 34 serves three basic purposes. First, its main purpose is to provide electrodynamic instrument damping. In addition, the damping plate 34 locates the shaft 42 during assembly and properly positions the magnet coil 35 in the bottom housing portion 12 in association with ribs 27.

Briefly summarizing, this invention provides an electrical measuring instrument having an accuracy which is fundamentally determined by the machining tolerances. Therefore, the requirements for simple zero point adjustments are satisfied. The zero point and sensitivity are controlled by a magnetic field producing means located in a fixed angular position but slidably mounted to vary the sensitivity of the instrument. In addition, the instrument includes coil supporting means which additionally dampen the meter and serve to facilitate blind assembly of the jeweled supporting structure.

The foregoing is a description of an illustrative embodiment of the invention, and it is the intention of the appended claims to cover all forms which fall within the scope of the invention.

What is claimed as new and desired to be secured by Letters Patent of the United States is:

1. An electrical measuring instrument comprising:
   (a) a non-magnetic hollow housing including first and second members forming a top portion and a bottom portion, said top and bottom portions being matingly engageable to define an internal cavity and clamping means to clamp said top and bottom portions together, said clamping means being external to said housing portions,
   (b) a shaft,
   (c) means located within said housing for mounting said shaft for rotation about a first axis,
   (d) means connected to said shaft for indicating shaft position, (e) a plurality of spaced, planar permanent magnets affixed to said shaft,
(f) first means located within said housing for producing a magnetic field in response to electrical energy whereby said shaft is caused to rotate about said first axis an amount which is determined by the strength of the magnetic field,
(g) means in said housing for mounting said first magnetic field producing means adjacent said plurality of spaced, planar permanent magnets, said magnetic field producing means mounting means being constituted by a plurality of ribs and a plate, the plane of said plate being co-extensive with said first axis and being spaced from said ribs, said ribs being integral with said housing and extending inwardly into said cavity from side walls of said housing parallel to the plane of said plate,
(h) second magnetic field producing means,
(i) means integrally formed on an exterior portion of said housing for supporting said second magnetic field producing means so that a magnetic field is produced thereby having poles which are angularly fixed with respect to the said shaft to locate the zero point when said first magnetic field producing means is de-energized, said second magnetic field producing means being slidably mounted in said support means to vary the coupling between said second magnetic field producing means and one of said plurality of spaced planar permanent magnets without changing the zero set point, and
(j) means for fixedly locating the said second magnetic field producing means on said support means.

2. An electrical measuring instrument as recited in claim 1 wherein said plate is composed of a non-magnetic, electrically conductive material.

3. An electrical measuring instrument as recited in claim 2 wherein said plate includes a plurality of spaced, parallel, elongated openings formed therethrough, a centrally disposed offset portion extending perpendicular to said elongated openings, and integral tabs extending perpendicularly from said plate, said plate being disposed in said housing and said shaft being located adjacent said offset portion for locating said shaft and said plate in a common plane, said offset portion being dimensioned so that said shaft axis is displaced slightly during initial assembly when one end of sad shaft is properly located in one of said jewels, the other end of said shaft being engageable with said other of said jewels when said housing portions are matingly engaged, said openings and said offset portion permitting said shaft and said plate to lie in a common plane, when the measuring instrument is assembled each of said plurality of said magnets extending through each of said plurality of elongated openings for rotation therethrough, the plate providing electrodynamic damping and said tabs engaging said coil to locate said coil with respect to said plate and said shaft.

4. An electrical measuring device comprising:
(a) a non-magnetic housing,
(b) a shaft rotatably mounted within said housing for rotation about a fixed axis,
(c) a pointer affixed to said shaft,
(d) a plurality of spaced planar permanent magnets affixed to said shaft,
(e) a coil,
(f) means for supporting the coil in said housing adjacent said permanent magnets, and
(g) zero set and sensitivity adjustment means including a linear slot formed in the exterior portion of said housing and a magnetic strip slidably mounted in said slot, said magnetic strip producing a magnetic field linking the magnetic field produced by said permanent magnets and said slot being positioned so that the magnetic strip lies in a plane perpendicular to the axis of said shaft and is guided for adjusting movement in a radial direction with respect to the axis of said shaft whereby the orientation of said slot and strip in relation to said permanent magnets determines the zero set point for the instrument and the position of said strip in said slot determines the sensitivity of the instrument.

References Cited

UNITED STATES PATENTS

| 2,493,376 | 1/1950 | Zar | 324—146 X |
| 2,837,716 | 6/1958 | Wolferz | 324—144 |
| 2,954,526 | 9/1960 | Pfeffer et al. | 324—146 |
| 2,968,000 | 1/1961 | Pfeffer | 324—146 |
| 2,978,639 | 4/1961 | Lawson | 324—146 |
| 2,836,793 | 5/1958 | Kelly | 324—156 X |
| 3,150,318 | 9/1964 | Friedmann | 324—156 |

ALFRED E. SMITH, Primary Examiner

U.S. Cl. X.R.

324—125, 156